United States Patent
Fang et al.

(10) Patent No.: US 9,910,532 B2
(45) Date of Patent: Mar. 6, 2018

(54) BRIDGING STRUCTURE FOR TOUCH PANEL AND TOUCH PANEL

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Zhixiang Fang, Beijing (CN); Ming Hu, Beijing (CN); Taofeng Xie, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 192 days.

(21) Appl. No.: 14/785,639

(22) PCT Filed: Apr. 17, 2015

(86) PCT No.: PCT/CN2015/076838
§ 371 (c)(1),
(2) Date: Oct. 20, 2015

(87) PCT Pub. No.: WO2016/074439
PCT Pub. Date: May 19, 2016

(65) Prior Publication Data
US 2016/0334915 A1 Nov. 17, 2016

(30) Foreign Application Priority Data
Nov. 13, 2014 (CN) .......................... 2014 1 0642074

(51) Int. Cl.
*G06F 3/044* (2006.01)
*G06F 3/041* (2006.01)

(52) U.S. Cl.
CPC ............ *G06F 3/0416* (2013.01); *G06F 3/044* (2013.01); *G06F 2203/04111* (2013.01)

(58) Field of Classification Search
CPC ........... G06F 3/044; G06F 2203/04103; G06F 2203/04112; G06F 2203/04111;
(Continued)

(56) References Cited

U.S. PATENT DOCUMENTS

| 9,203,403 | B2 * | 12/2015 | Chiu ..................... H03K 17/962 |
| 2011/0279401 | A1 | 11/2011 | Hong et al. |
| 2015/0130760 | A1 * | 5/2015 | Kim ....................... G06F 3/044 345/174 |

FOREIGN PATENT DOCUMENTS

| CN | 101907944 A | 12/2010 |
| CN | 102253777 A | 11/2011 |

(Continued)

OTHER PUBLICATIONS

Office Action dated Sep. 29, 2016 issued in corresponding Chinese Application No. 201410642074.5.
(Continued)

*Primary Examiner* — Duc Dinh
(74) *Attorney, Agent, or Firm* — Nath, Goldberg & Meyer; Joshua B. Goldberg

(57) ABSTRACT

The present invention discloses a bridging structure for touch panel and a touch panel. The bridging structure comprises a metal bridge and an insulating block provided on the metal bridge, the metal bridge has two end portions protruding beyond the insulating block, which are used for electrically connecting to two electrode blocks to be connected, respectively, the bridging structure further comprises at least one supporting portion, at least a part of which is located at an outer side of the end portions, and the supporting portion fills a gap between the electrode block and the end portion. In the present invention, by providing the
(Continued)

supporting portion at the junction of the electrode block and the metal bridge, climbing path of the electrode block on the metal bridge is optimized, electrical connection of the bridging structure becomes more stable and reliable, and antistatic ability of the touch panel is improved.

20 Claims, 3 Drawing Sheets

(58) Field of Classification Search
CPC ...... G06F 3/0488; G06F 3/047; H01J 2329/8625; H01J 29/02; G09G 2310/08; G09G 3/3655; G09G 3/3696; G09G 2300/0426; H01R 13/516; H01R 13/58; H01R 13/62; H01R 13/6273; H01R 13/642; H01R 24/58; H01R 24/60; H01R 29/00
USPC .................................................. 345/173–175
See application file for complete search history.

(56) References Cited

FOREIGN PATENT DOCUMENTS

| CN | 102279686 A | 12/2011 |
|---|---|---|
| CN | 102346609 A | 2/2012 |
| CN | 202838249 U | 3/2013 |
| CN | 203204585 U | 9/2013 |
| CN | 203561963 U | 4/2014 |
| CN | 203825593 U | 9/2014 |
| CN | 104317457 A | 1/2015 |
| CN | 204117118 U | 1/2015 |

OTHER PUBLICATIONS

Form PCT/ISA/237 issued in international application No. PCT/CN2015/076838.

* cited by examiner

BRIDGING STRUCTURE FOR TOUCH PANEL AND TOUCH PANEL

This is a National Phase Application filed under 35 U.S.C. 371 as a national stage of PCT/CN2015/076838, filed Apr. 17, 2015, an application claiming the benefit of Chinese Application No. 201410642074.5, filed Nov. 13, 2014, the content of each of which is hereby incorporated by reference in its entirety.

FIELD OF THE INVENTION

The present invention relates to the field of touch technology, and particularly to a bridging structure for touch panel and a touch panel.

BACKGROUND OF THE INVENTION

One glass solution (OGS) is a technique that an indium tin oxide (ITO) conductive film (i.e., a touch sensor) is formed directly on a protective glass so that one piece of glass plays both roles of protection and touch control.

FIG. 1 is a schematic plan view of a bridging structure of a touch panel in the prior art, and FIG. 2 is an enlarged diagram of a portion at reference number I in FIG. 1. The bridging structure comprises a metal bridge 1 and an insulating block 3 provided on the metal bridge 1. A first electrode 21 and a second electrode 22 (which are generally made of ITO) extending in different directions are provided on a layer on which the insulating block 3 is located. The first electrode 21 and the second electrode 22 are insulated from each other, the first electrode 21 comprises a plurality of first electrode blocks 210, and two first electrode blocks 210 adjacent in the extending direction of the first electrode 21 are electrically connected through the metal bridge 1. As shown in FIG. 1, the second electrode 22 has a continuous structure in its extending direction, but the specific structure thereof is not limited thereto. Reference number a in FIG. 2 illustrates a position where the first electrode block 210 is electrically connected to the metal bridge 1.

FIG. 3 is a schematic cross-sectional diagram at connection of a first electrode block 210 and a metal bridge 1 under ideal conditions, but in actual operation, limited by existing process conditions, ideal conditions can hardly be achieved. FIG. 4 is a schematic cross-sectional diagram at connection of a first electrode block 210 and a metal bridge 1 in an actual process. Due to a level difference between the first electrode block 210 and the mental bridge 1, the first electrode block 210 is likely to fracture and collapse at point b of the bridge, which disables or deteriorates electrical connection between the first electrode block 210 and the metal bridge 1, thereby worsening antistatic ability of the touch panel and affecting performance of the touch panel.

SUMMARY OF THE INVENTION

An object of the present invention is to provide a bridging structure for touch panel and a touch panel, so as to improve antistatic ability of the touch panel.

In order to solve the above technical problem, as an aspect of the present invention, there is provided a bridging structure for touch panel, comprising a metal bridge and an insulating block provided on the metal bridge, the metal bridge has two end portions protruding beyond the insulating block, which are used for electrically connecting to two electrode blocks to be connected, respectively, the bridging structure further comprises at least one supporting portion, at least a part of the supporting portion is located at an outer side of the end portion, and the supporting portion fills a gap between the electrode block and the end portion.

Preferably, the entire supporting portion is located at the outer side of the end portion.

Preferably, a part of the supporting portion is located at the outer side of the end portion, and the other part thereof is located on the end portion.

Preferably, top surface of the supporting portion is a curved surface protruding outwardly.

Preferably, the highest point of the supporting portion is higher than the end portion of the metal bridge.

Preferably, the supporting portion is made of a resin material.

Preferably, the supporting portion is formed simultaneously with the insulating block.

As an second aspect of the present invention, there is further provided a touch panel comprising first electrodes each extending along a first direction and second electrodes each extending along a second direction, the first electrodes and the second electrodes are intersecting with and insulated from each other, the first electrode comprises a plurality of first electrode blocks and a plurality of bridging structures, and two first electrode blocks adjacent in the first direction are electrically connected through the bridging structure, at least one of the plurality of bridging structures is the above-described bridging structure provided by the present invention, the first electrode block is formed above the layer in which the insulating block of the bridging structure is located, and two end portions of the metal bridge of the bridging structure are electrically connected to two first electrode blocks adjacent in the first direction, respectively.

Preferably, the first electrode block comprises a first part on the supporting portion and a second part on the end portion of the metal bridge, the highest point of the supporting portion is higher than the end portion of the metal bridge, and the highest point of the first part is higher than the second part.

Preferably, top surface of the supporting portion is a curved surface protruding outwardly, the first part of the first electrode block is a curved surface part, the second part thereof is a plane part, and the highest point of the curved surface part is higher than a plane in which the plane part is located.

In the present invention, by providing the supporting portion at the junction of the electrode block and the metal bridge, climbing path of the electrode block on the metal bridge is optimized, the electrode block and the metal bridge are lapped over each other better, fracture and collapse caused by the level difference between the electrode block and the end portion of the metal bridge are effectively avoided, electrical connection of the bridging structure becomes more stable and reliable, and antistatic ability of the touch panel is improved.

BRIEF DESCRIPTION OF THE DRAWINGS

The accompanying drawings, which constitute a part of the specification, are used for providing a further understanding of the present invention, and are used for explaining the present invention together with the following specific implementations, rather than limiting the present invention. In the drawings.

In the drawings.

1: metal bridge; 10: end portion; 21: first electrode; 22: second electrode; 210: first electrode block; 3: insulating block; 31: supporting portion; 210a: first part of first electrode block; 210b: second part of first electrode block.

DETAILED DESCRIPTION OF THE EMBODIMENTS

Specific implementations of the present invention will be described in detail below in conjunction with the accompanying drawings. It should be understood that, the specific implementations described herein are merely used for describing and explaining the present invention, rather than limiting the present invention.

Figure 1:
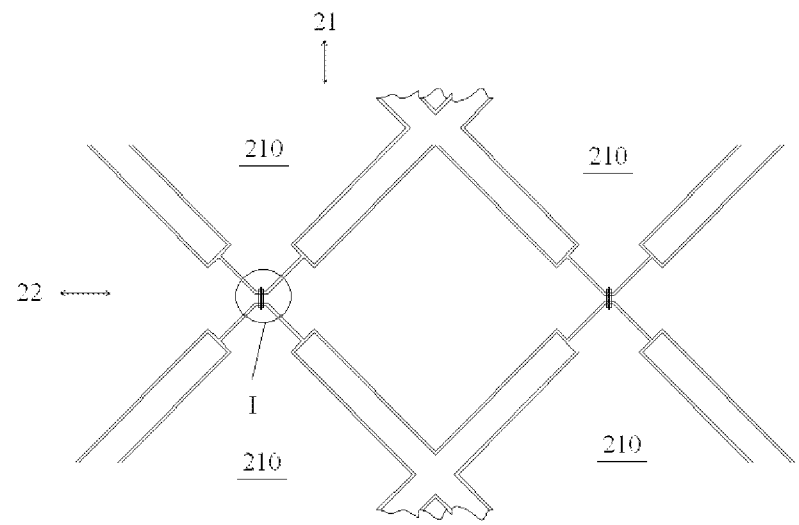
FIG. 1 is a schematic plan view of a bridging structure of a touch panel in the prior art.
Figure 2:
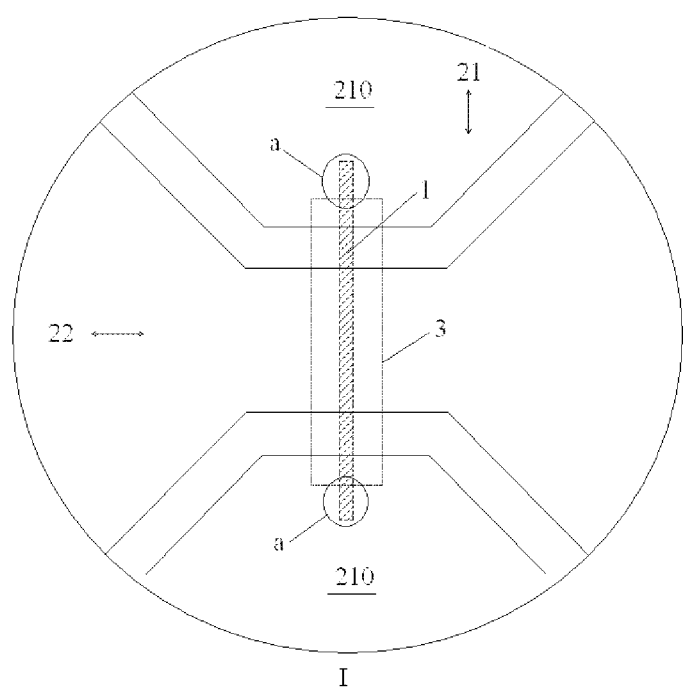
FIG. 2 is an enlarged diagram of a portion at reference number I in FIG. 1.
Figure 3:
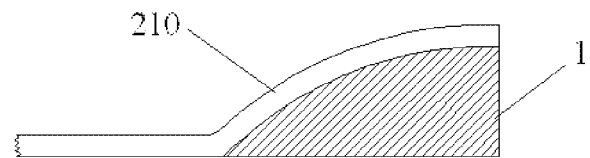
FIG. 3 is a schematic cross-sectional diagram at connection of a first electrode block and a metal bridge under ideal conditions.
Figure 4:
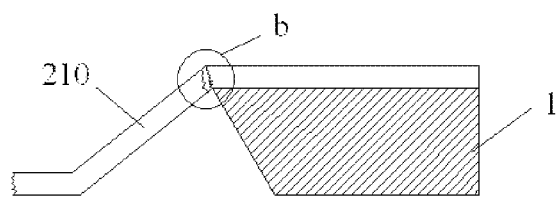
FIG. 4 is a schematic cross-sectional diagram at connection of a first electrode block and a metal bridge in an actual process.
Figure 5:
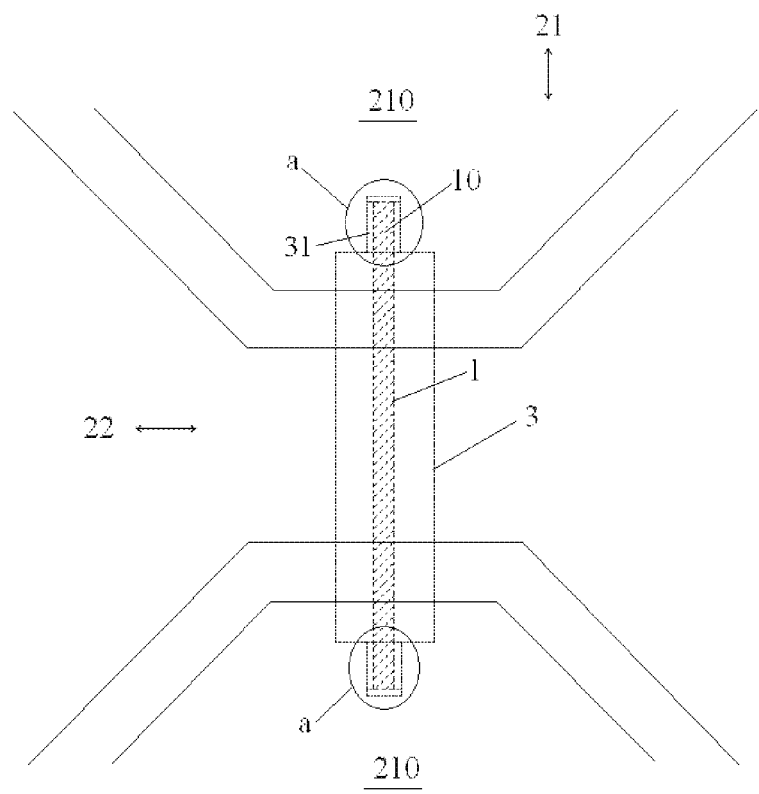
FIG. 5 is a schematic plan view of a bridging structure provided by the present invention.

The present invention provides a bridging structure for touch panel, and FIG. 5 is a schematic plan view of the bridging structure. The bridging structure comprises a metal bridge 1 and an insulating block 3 provided on the metal bridge 1, the metal bridge 1 has two end portions 10 protruding beyond the insulating block 3, the two end portions 10 are used for electrically connecting to two electrode blocks to be connected, respectively (as shown at reference number a in the figure), the bridging structure further comprises at least one supporting portion 31, at least a part of which is located at an outer side of the end portions 10, and the supporting portion 31 fills a gap between the electrode block and the end portion 10.

As described above, the touch panel generally comprises first electrodes 21 and second electrodes 22 which are provided above the layer in which the insulating block 3 is located and extend along different directions. Here, the first electrodes 21 and the second electrodes 22 are insulated from each other. The first electrode 21 comprises a plurality of first electrode blocks 210, and two first electrode blocks 210 adjacent in the extending direction of the first electrode 21 are electrically connected through the metal bridge 1. In FIG. 5, two end portions 10 of the metal bridge 1 are electrically connected to two first electrode blocks 210 which are adjacent vertically, respectively.

Figure 6:
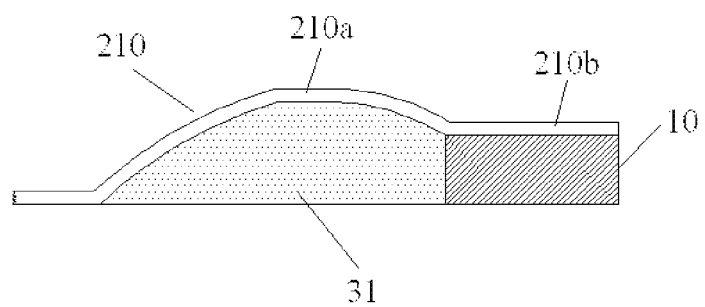
FIG. 6 is a schematic cross-sectional diagram at connection of a first electrode block and an end portion of a metal bridge in the bridging structure provided by the present invention.

FIG. 6 is a schematic cross-sectional diagram at connection of one first electrode block 210 and one end portion 10 of the metal bridge 1. Since at least a part of the supporting portion 31 is located at an outer side of the end portion 10, when the first electrode block 210 is formed above the layer in which the insulating block 3 is located, the supporting portion 31 may be located at the junction between the first electrode block 210 and the end portion 10 of the metal bridge 1 and block up a portion of the first electrode block 210 immediately close to an outer side of the end portion 10 of the metal bridge 1 (as shown in FIG. 6) (i.e., the gap generated by a level difference between the first electrode block 210 and the end portion 10 of the metal bridge 1 at the junction thereof is filled). In this way, shape of the junction between the first electrode block 210 and the end portion 10 of the metal bridge 1 is adjusted, climbing path of the first electrode block 210 is optimized, the first electrode block 210 and the metal bridge 1 are better lapped over each other above the end portion 10 of the metal bridge 1, problems such as fracture caused by the level difference between the first electrode block 210 and the end portion 10 of the metal bridge 1 are effectively avoided, electrical connection of the bridging structure becomes more stable and reliable, and antistatic ability of the touch panel is improved.

Figure 7:
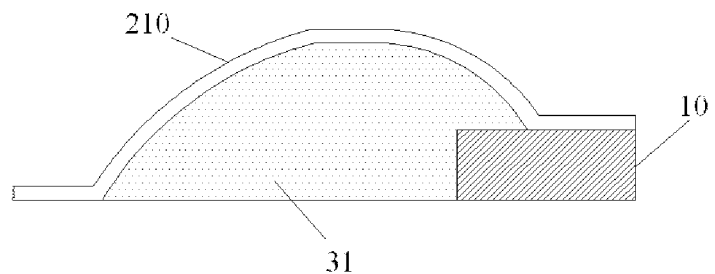
FIG. 7 is another schematic cross-sectional diagram at connection of a first electrode block and an end portion of a metal bridge in the bridging structure provided by the present invention.

In the present invention, the entire supporting portion 31 may be located at the outer side of the end portion 10 of the metal bridge 1, as shown in FIG. 6; alternatively, one part of the supporting portion 31 may be located at the outer side of the end portion 10 of the metal bridge 1, whereas the other part thereof may be located on the end portion 10 of the metal bridge 1, as shown in FIG. 7. However, the present invention is not limited thereto, and other layout of the supporting portion 31 can be possible, as long as the supporting portion 31 can fill the gap generated by the level difference between the electrode block 210 and the end portion 10 of the metal bridge 1, so that the climbing path of the first electrode block 210 is optimized and the first electrode block 210 is prevented from fracturing and collapsing.

In addition, the highest point of the supporting portion 31 is preferably higher than the end portion 10 of the metal bridge 1, as shown in FIGS. 6 and 7. This is because when the highest point of the supporting portion 31 is higher than the end portion 10 of the metal bridge 1, it can be further ensured that the gap generated by the level difference between the first electrode block 210 and the end portion 10 of the metal bridge 1 is filled, and problem that the first electrode block 210 may fracture can be avoided to the maximum extent.

Preferably, top surface of the supporting portion 31 is configured to be a curved surface protruding outwardly (e.g., cambered surface or spherical surface), and accordingly, the first electrode block 210 is electrically connected to the end portion 10 of the metal bridge 1 through the curved surface so that the climbing path of the first electrode block 210 can be optimized and the bridging structure in the present invention becomes more stable.

In the present invention, the supporting portion 31 may be made of any transparent insulating material, and for example, the supporting portion 31 may be made of a resin material.

Further, the supporting portion 31 may be formed integrally with the insulating block 3, i.e., both the two may be formed synchronously. For example, a halftone mask may be adopted. By adjusting light transmittance of the halftone mask at different positions, the insulating block 3 that is flat-shaped and the supporting portion 31 whose top surface is the curved surface protruding outwardly are synchronously formed through exposure. In this way, the present invention can be implemented without adding extra process steps.

The present invention provides a touch panel. As described above, by taking FIG. 5 as an example, the touch panel comprises first electrodes 21 each extending along a first direction and second electrodes 22 each extending along a second direction, and the first electrodes 21 and the second electrodes 22 are intersecting with and insulated from each other. Here, the first electrode 21 comprises a plurality of first electrode blocks 210 and a plurality of bridging structures, and two first electrode blocks 210 adjacent in the first direction are electrically connected through the bridging structure. At least one of the plurality of bridging structures is the above bridging structure provided by the present invention, the first electrode block 210 is formed above the layer in which the insulating block 3 of the bridging structure is located, and two end portions 10 of the metal bridge 1 of the bridging structure are electrically connected to two first electrode blocks 210 adjacent in the first direction, respectively.

In the touch panel provided by the present invention, since the supporting portion 31 is provided at the junction of the first electrode block 210 and the end portion 10 of the metal bridge 1, the first electrode block 210 is blocked up, which effectively avoids problems such as fracture caused by the level difference between the first electrode block 210 and the end portion 10 of the metal bridge 1, thereby avoiding problems such as invalid or poor electrical connection and improving antistatic ability of the touch panel.

Specifically, as shown in FIG. 6, the first electrode block 210 comprises a first part 210a on the supporting portion 31 and a second part 210b on the end portion 10 of the metal bridge 1. Since the highest point of the supporting portion 31 is preferably higher than the end portion 10 of the metal bridge 1, the highest point of the first part 210a is also higher than the second part 210b, thus ensuring excellent lap between the first electrode block 210 and the end portion 10 of the metal bridge 1, and avoiding, to the maximum extent, the problem that the first electrode block 210 may fracture.

When top surface of the supporting portion 31 is a curved surface protruding outwardly, the first part 210a of the first electrode block 210 is a curved surface part, the second part 210b thereof is a plane part, and the highest point of the curved surface part is preferably higher than the plane part, so that the climbing path of the first electrode block 210 can be optimized and the bridging structure becomes more stable.

To sum up, the touch panel provided by the present invention has better electrical connection performance, in the meanwhile, stability of the bridging structure is enhanced, and antistatic ability of the touch panel is effectively improved.

It can be understood that, the above implementations are merely exemplary implementations used for explaining the principle of the present invention, but the present invention is not limited thereto. For those skilled in the art, various modifications and improvements may be made without departing from the spirit and essence of the present invention, and these modifications and improvements are also deemed as falling within the protection scope of the present invention.

The invention claimed is:

1. A bridging structure for touch panel, comprising a metal bridge and an insulating block provided on the metal bridge, wherein, the metal bridge has two end portions protruding beyond the insulating block, which are used for electrically connecting to two electrode blocks to be connected, respectively, the bridging structure further comprises at least one supporting portion, at least a part of the supporting portion is located at an outer side of the end portions, and the supporting portion fills a gap between the electrode blocks and the end portions, wherein, a level difference exists between each end portion of the metal bridge and a corresponding electrode block at the junction of the end portion and the electrode block, and the supporting portion fills a gap between the end portion and the electrode block caused by the level difference.

2. The bridging structure according to claim 1, wherein, the entire supporting portion is located at the outer side of the end portion.

3. The bridging structure according to claim 2, wherein, top surface of the supporting portion is a curved surface protruding outwardly.

4. The bridging structure according to claim 2, wherein, the highest point of the supporting portion is higher than the end portion of the metal bridge.

5. The bridging structure according to claim 2, wherein, the supporting portion is made of a resin material.

6. The bridging structure according to claim 2, wherein, the supporting portion is formed simultaneously with the insulating block.

7. The bridging structure according to claim 1, wherein, a part of the supporting portion is located at the outer side of the end portion, and the other part thereof is located on the end portion.

8. The bridging structure according to claim 7, wherein, top surface of the supporting portion is a curved surface protruding outwardly.

9. The bridging structure according to claim 7, wherein, the highest point of the supporting portion is higher than the end portion of the metal bridge.

10. The bridging structure according to claim 7, wherein, the supporting portion is made of a resin material.

11. The bridging structure according to claim 7, wherein, the supporting portion is formed simultaneously with the insulating block.

12. The bridging structure according to claim 1, wherein, top surface of the supporting portion is a curved surface protruding outwardly.

13. The bridging structure according to claim 1, wherein, the highest point of the supporting portion is higher than the end portion of the metal bridge.

14. The bridging structure according to claim 1, wherein, the supporting portion is made of a resin material.

15. The bridging structure according to claim 1, wherein, the supporting portion is formed simultaneously with the insulating block.

16. A touch panel, comprising first electrodes each extending along a first direction and second electrodes each extending along a second direction, wherein, the first electrodes and the second electrodes are intersecting with and insulated from each other, the first electrode comprises a plurality of first electrode blocks and a plurality of bridging structures, and two first electrode blocks adjacent in the first direction are electrically connected through the bridging structure, at least one of the plurality of bridging structures is the bridging structure according to claim 1, the first electrode block is formed above the layer in which the insulating block of the bridging structure is located, and two end portions of the metal bridge of the bridging structure are electrically connected to two first electrode blocks adjacent in the first direction, respectively.

17. The touch panel according to claim 16, wherein, the first electrode block comprises a first part on the supporting portion and a second part on the end portion of the metal bridge, the highest point of the supporting portion is higher than the end portion of the metal bridge, and the highest point of the first part is higher than the second part.

18. The touch panel according to claim 17, wherein, top surface of the supporting portion is a curved surface protruding outwardly, the first part of the first electrode block is a curved surface part, the second part thereof is a plane part, and the highest point of the curved surface part is higher than a plane in which the plane part is located.

19. The touch panel according to claim 16, wherein, the supporting portion is made of a resin material.

20. The touch panel according to claim 16, wherein, the supporting portion is formed simultaneously with the insulating block.

* * * * *